United States Patent
Dukalski

(10) Patent No.: US 12,554,030 B2
(45) Date of Patent: Feb. 17, 2026

(54) METHOD AND SYSTEM FOR TRUE ABSOLUTE AMPLITUDE SEISMIC IMAGING

(71) Applicant: SAUDI ARABIAN OIL COMPANY, Dhahran (SA)

(72) Inventor: Marcin Szymon Dukalski, Delft (NL)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 469 days.

(21) Appl. No.: 18/160,909

(22) Filed: Jan. 27, 2023

(65) Prior Publication Data
US 2024/0255665 A1    Aug. 1, 2024

(51) Int. Cl.
*G01V 1/30* (2006.01)

(52) U.S. Cl.
CPC .......... *G01V 1/307* (2013.01); *G01V 2210/63* (2013.01)

(58) Field of Classification Search
CPC ........................... G01V 1/307; G01V 2210/63
See application file for complete search history.

(56) References Cited

U.S. PATENT DOCUMENTS

| | | | | |
|---|---|---|---|---|
| 6,154,705 | A * | 11/2000 | McCormack | G05B 13/0265 702/17 |
| 6,832,161 | B1 | 12/2004 | Moore | |
| 2013/0100771 | A1 * | 4/2013 | Diallo | G01V 1/36 367/63 |
| 2016/0327668 | A1 | 11/2016 | Pires De Vasconcelos | |
| 2017/0248716 | A1 | 8/2017 | Poole | |
| 2017/0248721 | A1 | 8/2017 | Poole et al. | |
| 2020/0025958 | A1 | 1/2020 | Kamil Amin et al. | |

(Continued)

FOREIGN PATENT DOCUMENTS

| | | |
|---|---|---|
| CN | 107102355 B | 12/2017 |
| CN | 110879416 B | 8/2021 |

(Continued)

OTHER PUBLICATIONS

Roald van Borselen, "Fast-Track, Data-Driven Interbled Multiple Removal: A North Sea Data Example", 64th EAGE Conference and Exhibition—Florence, Italy; May 2002; pp. 1-4 (4 pages).

(Continued)

*Primary Examiner* — Mohammad K Islam
(74) *Attorney, Agent, or Firm* — Osha Bergman Watanabe & Burton LLP

(57) ABSTRACT

Examples of methods and systems for determining a true absolute-amplitude seismic dataset are disclosed. The methods include obtaining an observed seismic dataset, where the observed seismic dataset includes observed seismic traces containing primary reflections and multiple reflections, and selecting a primary-free time window of the observed seismic traces that contains only observed multiple reflections. The methods further include, using a seismic processing system, determining output seismic traces within the primary-free time window using a multiple prediction method, where determining output seismic traces include determining a scalar multiplier based, at least in part, on the output seismic traces, and determining the true absolute-amplitude seismic dataset based, at least in part, on the observed seismic dataset and the scalar multiplier.

15 Claims, 9 Drawing Sheets

(56) References Cited

U.S. PATENT DOCUMENTS

2022/0066060 A1 3/2022 Gillott
2022/0326404 A1* 10/2022 Poole ............... G01V 1/28

FOREIGN PATENT DOCUMENTS

CN 113219535 A 8/2021
CN 113917535 A 1/2022

OTHER PUBLICATIONS

M. Dukalski and K. de Vos; "Marchenko inversion in a strong scattering regime including surface-related multiples", Geophysical Journal International; vol. 212; Issue 2; Feb. 2018; pp. 760-776 (17 pages).
M. Dukalski et al.; "Handling short-period scattering using augmented Marchenko autofocusing", Geophysical Journal International; vol. 216; Issue 3; Mar. 2019; pp. 2129-2133 (5 pages).
M. Dukalski and K. de Vos; "A Closed Formula For True-Amplitude Overburden-Generated Interved De-Multiple", 82nd EAGE Conference and Exhibition; 2021; pp. 1-5 (5 pages).
M. Dukalski and K. de Vos; "Overburden-borne internal demultiple formula", Geophysics; vol. 87; No. 3; May 2022; pp. V227-V246 (20 pages).
P. Elison et al.; "Data-driven control over short-period internal multiples in media with a horizontally layered overburden", Geophysical Journal International; vol. 211; Jan. 2020; pp. 769-787 (19 pages).
Luc T. Ikelle; "A construct of internal multiples from surface data only: the concept of virtual seismic events", Geophysical Journal International; vol. 164; Issue 2; Feb. 2006; pp. 383-393 (11 pages).
Helmut Jakubowicz; "Wave equation prediction and removal of interbed multiples", SEG Technical Program Expanded Abstracts 1998; 1998; pp. 1-4 (4 pages).
Kueyi (Alex) Jia; "Marchenko Imaging for 2D and 3D Complex Structures—With Field Applications to Sub-Salt and Sub-Basalt Imaging", Masters Thesis, Colorado School of Mines, Department of Geophysics; 2019; pp. 1-158 (158 pages).
J. van der Neut and K. Wapenaar; "Adaptive overburden elimination with the multidimensional Marchenko equation", Geophysics; vol. 81; No. 5; Sep. 2016; pp. T265-T284 (20 pages).
H. Peng et al.; "Data-Driven Multiple Suppression For Laterally Varying Overburden With Thin Beds", 82nd EAGE Conference and Exhibition; 2021; pp. 1-5 (5 pages).
Christian Reinicke Urruticoechea; "Elastodynamic Marchenko inverse scattering: A multiple-elimination strategy for imaging of elastodynamic seismic reflection data", Ph.D. Thesis, Delft Univesity of Technology; 2020; pp. 1-204 (204 pages).
C. Reinicke and M. Dukalski; "Effective Media Theory Consistent Multiple Elimination with the Marchenko Equation Based Methods", EAGE2020: Annual Conference Online; 2020; pp. 1-5 (5 pages).
M. Staring et al.; "Robust estimation of primaries by sparse inversion and Marchenko equation-based workflow for multiple suppression in the case of a shallow water layer and a complex overburden: A 2D case study in the Arabian Gulf", Geophysics; vol. 86; No. 2; Mar. 2021; pp. Q15-Q25 (11 pages).
K. Wapenaar et al.; "Marchenko imaging", Geophysics; vol. 79; No. 3; May 2014; pp. WA39-WA57 (19 pages).
J. A. Ware and K. Aki; "Continuous and Discrete Inverse-Scattering Problems in a Stratified Elastic Medium. I. Plane Waves at Normal Incidence", The Journal of Acoustical Society of America; vol. 45; 1968; pp. 1-11 (11 pages).
L. Zhang et al.; "Transmission compensated primary reflection retrieval in the data domain and consequences for maging", Geophyics; vol. 84; No. 4; Jul. 2019; pp. Q27-Q36 (10 pages).
L. Zhang et al.; "Artifact-free reverse time migration", Geophysics; vol. 83; No. 5; Sep. 2018; pp. A65-A68 (4 pages).
J. Thorbecke et al.; "Implementation of the Marchenko method", Geophysics; vol. 82; No. 6; Nov. 2017; pp. WB29-WB45 (17 pages).
A.J. Berkhout and D.J. Verschuur; "Removal of internal multiples", SEG Technical Program Expanded Abstracts 1999; 1999; pp. 1-4 (4 pages).
Joeri Brackenhoff; "Rescaling of incorrect source strength using Marchenko Redatuming: Using the Marchenko equation to determine correction factors", Master of Science Thesis, Delft University of Technology, Department of Geoscience and Engineering; Aug. 19, 2016; pp. 1-87 (87 pages).
K. Wapenaar et al.; "Marchenko redatuming, imaging and multiple elimination, and their mutual relations", Geophysics; vol. 86; No. 5; May 20, 2021; pp. 1-28 (28 pages).
M. Ravasi; "Rayleigh-Marchenko redatuming for target-oriented, true-amplitude imaging", Geophysics; vol. 82; Issue 6; 2017 (54 pages).

* cited by examiner

METHOD AND SYSTEM FOR TRUE ABSOLUTE AMPLITUDE SEISMIC IMAGING

BACKGROUND

In the oil and gas industry, seismic surveys are frequently used to image the subsurface of the earth and the resulting seismic images may be used in the search for hydrocarbon reservoirs. Seismic surveys use a seismic source emit elastic waves, hereinafter "seismic waves" into the subsurface of the earth. These seismic waves are refracted and reflected, sometime multiple times, before being recorded by seismic receivers, often disposed in arrays across the surface of the earth. These seismic receivers detect vibrations of the ground, hereinafter "ground motion", as seismic data. Seismic data may be time-series records of the velocity of ground motion, or the acceleration of ground motion, or when deployed in water, pressure fluctuations caused by the seismic waves. Ground motion may be measured along one, two, or three axes. For example, a three axis measurement may include a vertical ground motion, and two orthogonal horizontal ground motions.

Raw seismic data is of limited value and typically seismic data must be processed to form an image of the subsurface. Processing seismic data may include steps to ameliorate noise, including seismic multiples; determine seismic wave propagation velocity in the subsurface; form images of geological structure; and calculate attributes, indicative of the presence of hydrocarbons fluids within the pores of subsurface rock formations.

Traditionally, many seismic processing steps may be performed using seismic data for which only the relative amplitude of ground motion are known. These processing methods were developed because measuring the true absolute-amplitude was and remains a difficult technical challenge. In contrast, some processing methods require a true absolute-amplitude. For example, some seismic multiple elimination methods require an estimate of the true absolute-amplitude. Although methods, such as adaptive subtraction, have been developed estimate the true absolute-amplitude, or to compensate for the lack of knowledge of true absolute-amplitude, these methods may frequently be inadequate, imperfect, or prone to error. Consequently, an improved procedure for determining true absolute-amplitudes of seismic data forms a pressing need in the field of seismic processing.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for determining a true absolute-amplitude seismic dataset are disclosed. The methods include obtaining an observed seismic dataset, where the observed seismic dataset includes observed seismic traces containing primary reflections and multiple reflections, and selecting a primary-free time window of the observed seismic traces that contains only observed multiple reflections. The methods further include, using a seismic processing system, determining output seismic traces within the primary-free time window using a multiple prediction method, where determining output seismic traces include determining a scalar multiplier based, at least in part, on the output seismic traces, and determining the true absolute-amplitude seismic dataset based, at least in part, on the observed seismic dataset and the scalar multiplier.

In one aspect, embodiments disclosed herein relate to a non-transitory computer readable memory having computer-executable instructions stored thereon that, when executed by a processor, perform steps including obtaining an observed seismic dataset, where the observed seismic dataset includes observed seismic traces containing primary reflections and multiple reflections, selecting a primary-free time window of the observed seismic traces that contains only observed multiple reflections, and determining output seismic traces within the primary-free time window using a multiple prediction method, wherein determining output seismic traces includes determining a scalar multiplier based, at least in part, on the predicted seismic trace. The steps further include determining a true absolute-amplitude seismic dataset based, at least in part, on the observed seismic dataset and the scalar multiplier.

In one aspect, embodiments disclosed herein relate to a system including a seismic acquisition system configured to obtain a seismic dataset and a seismic processing system. The seismic processing system is configured to obtaining an observed seismic dataset, where the seismic dataset comprises observed seismic traces containing primary reflections and multiple reflections, select a primary-free time window of the observed seismic traces that contains only observed multiple reflections, and determine output seismic traces within the primary-free time window using a multiple prediction method, wherein determining output seismic traces comprises determining a scalar multiplier based, at least in part, on the output seismic traces. The seismic processing system is further configured to determine a true absolute-amplitude seismic dataset based, at least in part, on the observed seismic dataset and the scalar multiplier.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency. The size and relative positions of elements in the drawings are not necessarily drawn to scale. For example, the shapes of various elements and angles are not necessarily drawn to scale, and some of these elements may be arbitrarily enlarged and positioned to improve drawing legibility. Further, unless explicitly specified, the particular shapes of the elements as drawn are not necessarily intended to convey any information regarding the actual shape of the particular elements and have been solely selected for ease of recognition in the drawing.

DETAILED DESCRIPTION

Figure 1:
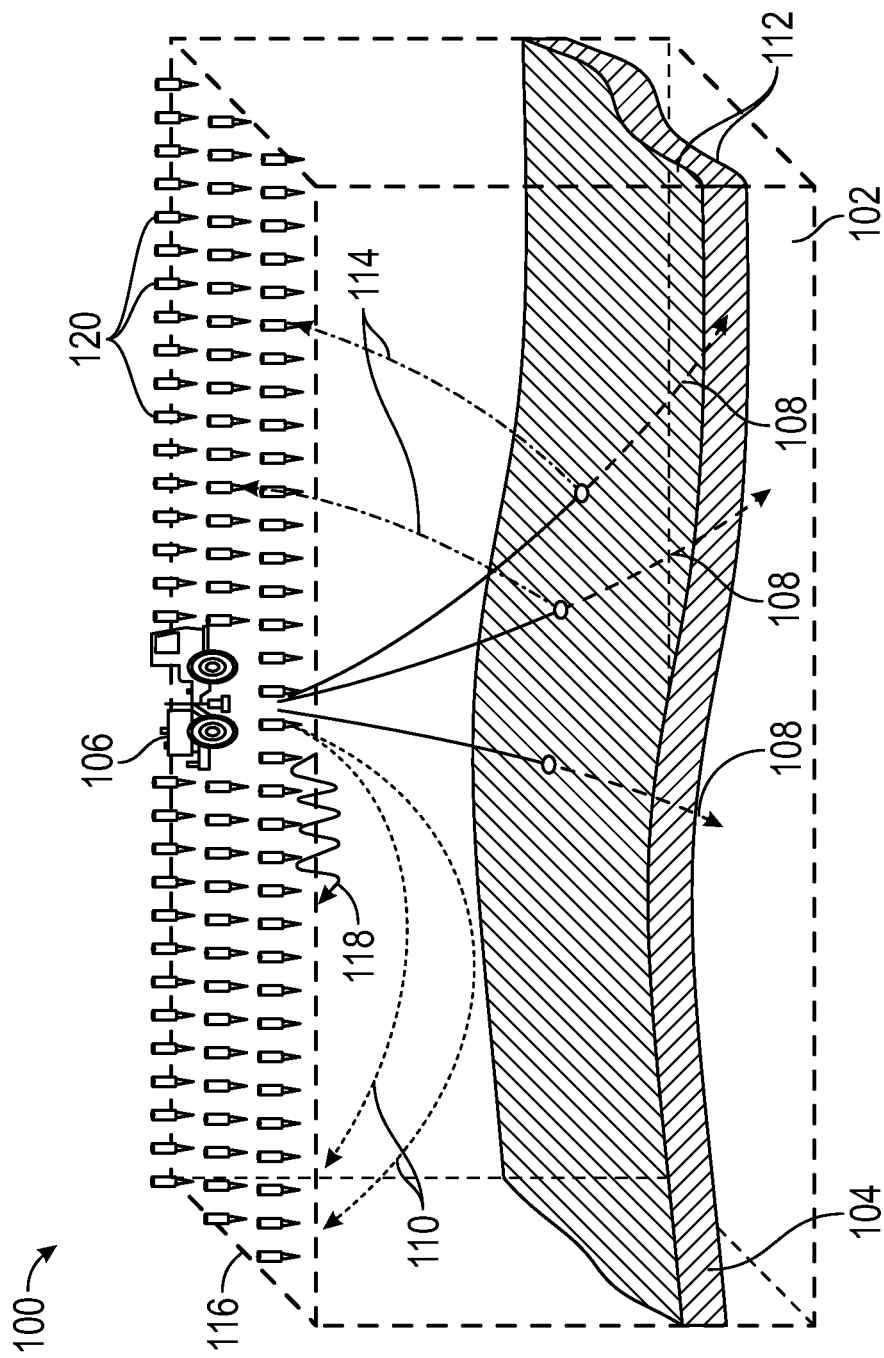
FIG. 1 depicts a seismic survey acquisition system and seismic wave propagation in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to a "seismic wave" includes reference to one or more of such seismic waves.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the method may be omitted, repeated, and/or performed in a different order than the order shown. Accordingly, the scope disclosed herein should not be considered limited to the specific arrangement of steps shown in the method.

Although multiple dependent claims are not introduced, it would be apparent to one of ordinary skill that the subject matter of the dependent claims of one or more embodiments may be combined with other dependent claims.

In the following description of FIGS. 1-8, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Seismic surveys are frequently conducted by participants in the oil and gas industry. Seismic surveys are conducted, using seismic acquisition systems, over subsurface regions of interest during the search for, and characterization of, hydrocarbon reservoirs. In seismic surveys, a seismic source generates seismic waves that propagate through the subterranean region of interest and are detected by seismic receivers. The seismic receivers detect and store a time-series of samples of earth motion caused by the seismic waves. The collection of time-series of samples recorded at many receiver locations generated by a seismic source at many source locations constitutes a seismic data set.

The terms "velocity model," or other similar terms as used herein refer to a numerical representation of parameters for subsurface regions. Generally, the numerical representation includes an array of numbers, typically a 2-D or 3-D array, where each number, which may be a value of seismic wave propagation velocity in a cell, where a subsurface region has been conceptually divided into discrete cells for computational purposes. For example, the spatial distribution of velocity may be modeled using constant-velocity units (layers) through which is ray paths obeying Snell's law can be traced.

A velocity model represents the seismic velocity or the speed with which a seismic wave propagates through a subsurface material. Different subsurface materials may exhibit different seismic velocities. A velocity model may be determined from a seismic dataset using a variety of methods, known to a person of ordinary skill in the art, collectively called "velocity analysis" or "migration velocity analysis (MVA)".

FIG. 1 shows a seismic acquisition system (100) configured to acquire a seismic dataset pertaining to a subterranean region of interest (102). The subterranean region of interest (102) may or may not contain a hydrocarbon reservoir (104). The purpose of the seismic survey may be to determine whether or not a hydrocarbon reservoir (104) is present within the subterranean region of interest (102).

The seismic acquisition seismic (100) may utilize a seismic source (106) positioned on the surface of the earth (116). On land the seismic source (106) is typically a vibroseis truck (as shown), or less commonly explosive charges, such as dynamite, buried to a shallow depth. In water, particularly in the ocean, the seismic source may commonly be an airgun (not shown) that releases a pulse of high-pressure gas when activated. Whatever its mechanical design, the seismic source (106) generates radiated seismic waves (108), such as those whose paths are indicated by the ray paths. The radiated seismic waves may be bent ("refracted") by variations in the speed of seismic wave propagation within the subterranean region of interest (102) and return to the surface of the earth (116) as refracted seismic waves (110). Alternatively, radiated seismic waves may be partially or wholly reflected by seismic reflectors and return to the surface as reflected seismic waves (114). Seismic reflectors may be indicative of the geological boundaries (112), such as the boundaries between geological layers, the boundaries between different pore fluids, faults, fractures or groups of fractures within the rock, or other structures of interest in the seismic for hydrocarbon reservoirs.

At the surface, the refracted seismic waves (110) and reflected seismic waves (114) may be detected by seismic receivers (120). On land a seismic receiver (120) may be a geophone (that records the velocity of ground motion) on an accelerometer (that records the acceleration of ground motion). In water, the seismic receiver may commonly be a hydrophone that records pressure disturbances within the water. Irrespective of its mechanical design or the quantity detected, seismic receivers (120) convert the detected seismic waves into electrical signals, that may subsequently be digitized and recorded by a seismic recorder as a time-series of samples. Such a time-series is typically referred to as a seismic "trace" and represents the amplitude of the detected seismic wave at a plurality of sample times. Usually, the sample times are referenced to the time of source activation and the sample times are referred to as "recording times". Thus, zero recording time occurs at the moment the seismic source is activated.

Each seismic receivers (120) may be positioned at a seismic receiver location that may be denoted $(x_r, y_r)$ where x and y represent orthogonal axes on the surface of the earth (116) above the subterranean region of interest (102). Thus, the refracted seismic waves (110) and reflected seismic waves (114) generated by a single activation of the seismic source (106) may be represented as a three-dimensional "3D" volume of data with axes $(x_r, y_r, t)$ where t indicates the recording time of the sample.

Typically, a seismic survey includes recordings of seismic waves generated by one or more seismic sources (106) positioned at a plurality of seismic source locations denoted $(x_s, y_s)$. In some case, one seismic source (106) may be used to acquire the seismic survey, with the seismic source (106) being moved sequentially from one seismic source location to another. In other cases, a plurality of seismic sources, such as seismic source (106), may be used each occupying and being activated ("fired") sequential at a subset of the total number of seismic source locations used for the survey. Similarly, some or all of the seismic receivers (120) may be moved between firing of the seismic source (106). For example, seismic receivers (120) may be moved such that the seismic source (106) remains at the center of the area covered by the seismic receivers (120) even as the seismic source (106) is moved from one seismic source location to the next. Thus, a seismic dataset, the aggregate of all the seismic data acquired by the seismic survey, may be represented as a five-dimensional volume, with coordinate axes $(x_r, y_r, y_s, y_s, t)$.

Typically, to determine earth structure, including the presence of hydrocarbons, the seismic data set may be processed. Processing a seismic dataset comprises a sequence of steps designed, without limitation, to do one or more of the following: correct for near surface effects; attenuate noise; compensate for irregularities in the seismic survey geometry; calculate a seismic velocity model; image reflectors in the subsurface; or calculate a plurality of seismic attributes to characterize the subterranean region of interest (102). The processed seismic data may yield velocity models, images, and attributes that may aid in decisions governing when and where to drill for hydrocarbons.

Seismic noise may be any unwanted recorded energy that is present in a seismic data set. Seismic noise may be random or coherent and its removal, or "denoising," is desirable in order to improve the accuracy and resolution of the seismic image. For example, seismic noise may include, without limitation, swell, wind, traffic, seismic interference, mud roll and ground roll (118). A properly processed seismic data set may aid in decisions as to if and where to drill for hydrocarbons.

A typical seismic dataset may be 100 Terabytes to 1 Petabyte in size, corresponding to between 10 trillion ($10^{13}$) and 100 trillion ($10^{14}$) data samples. Clearly, processing such a large volume of data mentally or manually, without the aid of an appropriately configured computer system, is completely unfeasible. Such a specially configured computer system may be termed a "seismic processor", or "seismic processing system", and include hardware and software elements. In addition to extensive arrays of computer processing units ("CPUs"), connected by high-speed communication channels the hardware of a typical seismic processing system typically includes large arrays of graphical processing units ("GPUs") to execute parallel processing, banks of high-speed tape readers or hard-drive readers to read the data from storage, high-speed tape or hard-drive writers to output final or intermediate results, and high-speed communication buses to connect these elements.

Furthermore, a seismic data processing system must be configured with software to execute the steps of seismic processing workflows. Such software must be designed and constructed with both the mathematical steps of the workflow and the input and output characteristics of the seismic processing system hardware in mind. For example, the software must implement algorithms that minimize the number of times seismic data or velocity models are read from hard disks into the cache memory of CPUs or GPUs. Multiples In particular, processing a seismic dataset may include forming a seismic image of the structure of the subsurface region of interest (102) using one or more of a group of processes called "seismic migration". Seismic migration uses seismic velocity model to determine the location at which reflected seismic waves (114) were generated from the radiated seismic waves (108). Many types of seismic migration method are available to practitioners of the art, each method having its unique combination of accuracy and computation cost characteristics. For example, seismic migration may include, without limitation, Kirchhoff time migration, Kirchhoff depth migration, Wave Equation migration, Reverse Time Migration, and Least-Squares Time Migration. Despite their differences, these and many other types of seismic migration share an important similarity, namely they assume that the seismic data to which they are applied consist of primary signals (or simply "primaries"). Primaries consist of seismic waves that travel as radiated seismic waves (108) from the seismic source (106), are reflected once at a seismic reflection point then propagate as reflected seismic waves (114) to seismic receivers (120).

However, recorded seismic data typically include other propagation paths for seismic waves not included in this "single bounce" paradigm. In particular, seismic datasets typically include "multiples"; i.e., waves that have reflected upwards (the first "bounce") from a first seismic reflector at a first depth, then reflected downwards (the second "bounce") from a second seismic reflector at a second depth, shallower than the first depth, and reflected upwards to the surface (the third "bounce") from a third seismic reflector at a third depth, deeper than the second depth. In some cases, the first and third seismic reflector may be the same reflector, but in many cases the first and second seismic reflectors will be distinct and lie at different depths. Seismic waves that have experienced three, or more, bounces of this nature are referred to as multiples.

Attempting to process seismic datasets containing primaries and multiples using seismic migration techniques that assume only primaries are present may lead to the imaging of false reflectors, the obscuring or blurring of real reflectors, loss of signal-to-noise ratio and other deleterious effects on the resulting seismic image.

Figure 2B:
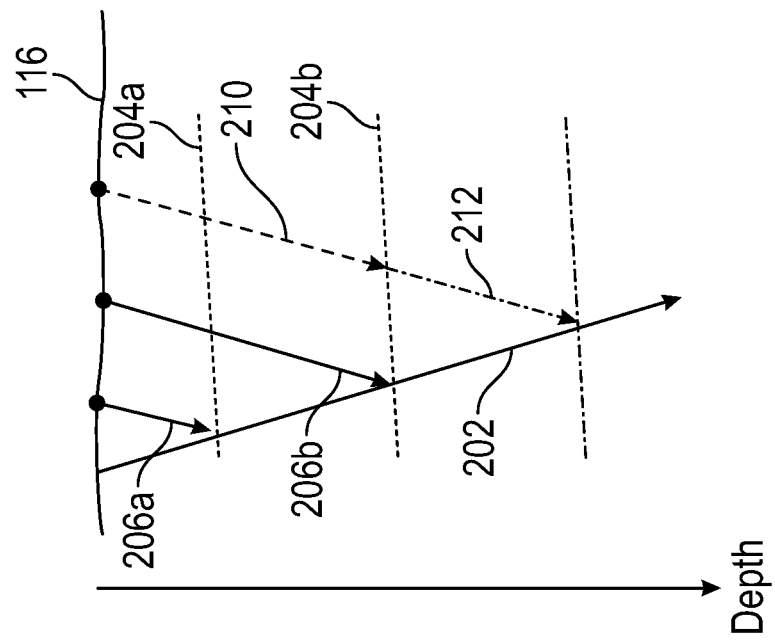
FIGS. 2A and 2B depict seismic multiple ray paths in accordance with one or more embodiments.
Figure 2A:
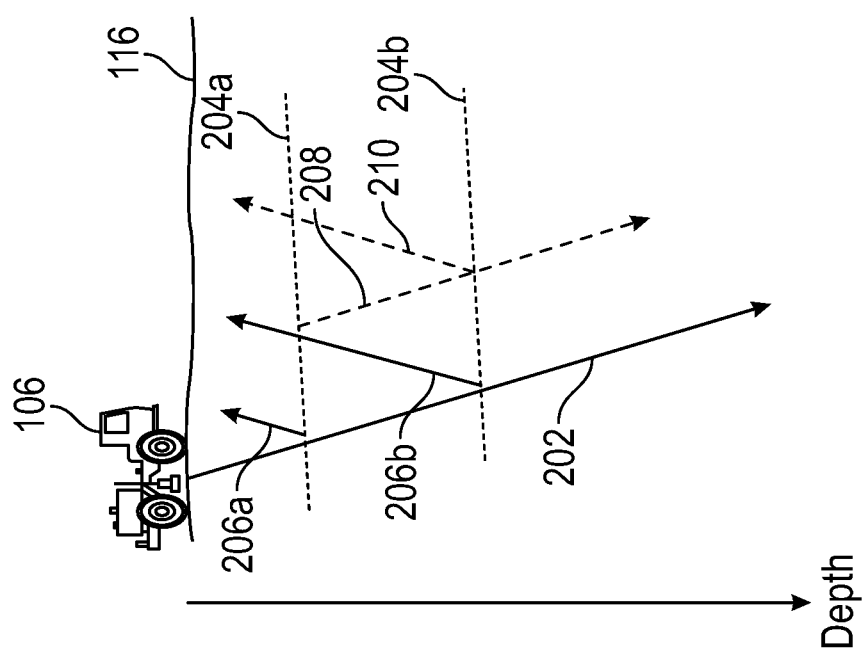

FIGS. 2A and 2B show schematic representations of seismic ray-paths in accordance with one or more embodiments. Specifically, FIG. 2A shows a schematic representation of a seismic wave propagating downward from a seismic source (106). The downward-propagating seismic wave (202) may cross several geological discontinuities, such as seismic reflectors (204a, 204b). At each of these geological discontinuities, the downward-propagating seismic wave (202) may generate an upward-propagating reflection ("primary reflection"), such as primary reflections (206a, 206b). The primary reflections (206a, 206b) each contain a portion of the energy from the downward-propagating seismic wave (202).

Upward-propagating primary reflections may also cross geological discontinuities, generating a new downward-propagating seismic wave. This effect is shown in the example in FIG. 2A, where primary reflection (206b) passes through seismic reflector (204a), generating downward-propagating seismic wave (208). Analogously, other primary reflections (not shown) may generate downward-propagating seismic waves at each geological discontinuity, but for clarity of display these combinations are not shown.

Continuing along the ray-path of downward-propagating seismic wave (208) in FIG. 2A, the seismic wave may once again cross a geological discontinuity, such as seismic reflector (204b), where an upward-propagating seismic wave (210) may be generated. It should be noted that upward-propagating seismic wave (210) is the product of multiple reflections. Seismic waves such as upward-propagating seismic wave (210) may then be recorded by seismic receivers (120) at the surface of the earth (116) and are frequently referred to as "multiple reflections," or simply "multiples." Further, the upward-propagating seismic wave (210) may be referred to as an "interbed multiple."

Multiples may be divided into two types depending on where the downward reflection occurs. For "surface multiples" the downward reflection occurs at the surface of the earth (116). Further, the order of a multiple refers to the number of downward reflections from the surface (e.g., "a first-order multiple" has a single downward reflection," and a "second-order multiple" has two downward reflections). For "internal multiples" or "interbed multiples," the downward reflection occurs at a geological interface below the free surface, such as seismic reflector (204a). A person of ordinary skill in the art may use internal multiple and interbed multiple synonymously and, although the term interbed is used herein, the scope of the present disclosure should be interpreted to include both interbed multiples and internal multiples. Surface multiples may be distinguished from primary reflections and partially or completely removed from seismic datasets more easily than are interbed multiples, at least in part, because they may be recorded by seismic receivers at the point at which the downward propagating reflection is generated, i.e., at the surface of the earth (116). In contrast, interbed multiples are typically not recorded at the point at which they are reflected downward, i.e., at seismic reflector (204a) below the surface of the earth. Multiple energy typically interferes with primary energy especially in deeper areas of interest for hydrocarbon exploration.

FIG. 2B depicts schematically the erroneous results that arise when input seismic data contains primary reflections and multiple reflections, but seismic processing methods assume the input seismic data contains only primary reflections. While primary reflection (206a) generates an image of seismic reflector (204a), and primary reflection (206b) generates an image of seismic reflector (204b), the multiple reflection (upward-propagating seismic wave (210)) is erroneously back-propagated (212) below seismic reflector (204b) to generate an erroneous seismic reflector (204c) in the seismic image. Such erroneous seismic reflectors may be misinterpreted as real seismic reflectors and/or may obscure real seismic reflectors. It is therefore desirable to remove multiple events from the seismic data as part of the processing flow, before generating a seismic image for interpretation of the subsurface.

The amplitudes of both primary reflections and multiple reflections depend in part on the reflection coefficient of the seismic reflectors (e.g., 204a and 204b in FIG. 2A) from which they are generated. Typically, a reflection coefficient lies in the range of 0-0.25 (excluding cases where larger offsets may generate refracted seismic waves (110) and the reflection coefficient may approach 1). Thus, an interbed multiple that experiences a reflection at each of two seismic reflectors may frequently be much smaller in amplitude than the amplitude of the primary reflections from seismic reflectors. As a result, it is common for one of ordinary skill in the art to distinguish seismic reflectors that are likely to generate significant multiples based on their large primary reflection amplitudes. For example, surface multiples may be predicted (or modeled) using the surface reflector (e.g., the surface of the earth) and interbed multiples may be predicted by identifying strong subsurface reflectors, or multiple "generators."

Multiple prediction, or multiple modeling, is typically the initial step of a multi-step process for multiple attenuation or removal. A predicted multiple model (or simply "multiple model") may be generated using data-driven multiple prediction techniques. Typically, a multiple model describes the relative amplitude and arrival time of seismic multiples but not their absolute amplitude. These techniques may be used to model interbed and surface multiples, including two-dimensional (2D) and three-dimensional (3D) methods. For surface multiples, as part of the surface-related multiple elimination (SRME) technique, surface related multiples are first predicted by convolving the seismic data with successive estimates of the primaries in a recursive estimation process. While SRME may be highly effective in deeper water marine seismic surveys, shallow water seismic data may require additional techniques due, in part, to strong overlapping high-order multiples generated from the surface layer.

For example, model-based water-layer de-multiple (MWD) is a technique specifically designed to predict and attenuate multiples in shallow water. The technique focuses on water-layer multiples and may be applied to the seismic data in conjunction with SRME or other multiple attenuation techniques.

Other more primitive multiple attenuation techniques may be implemented to generate a multiple model, such as methods that discriminate between primary and multiple events based on seismic event dip or moveout (e.g., f-k filters or radon-based methods). Deconvolutional methods may also be used to predict and remove reverberation patterns (i.e., multiple reflections) within the seismic data. Interbed multiples, however, have similar moveout, dip, frequency, and amplitude to primaries, reducing the effectiveness of traditional multiple attenuation methods.

Data-driven surface-related multiple prediction techniques may be extended to include interbed multiples, such as wave-equation based methods derived from the work of Jakubowicz (Jakubowicz H. "Wave equation prediction and removal of interbed multiple" 68*th Annual International Meeting, SEG, Expanded Abstracts*, 1527-1530 (1998)). These methods aim to predict the internal multiples by convolving and correlating the reflection response with itself, however some limitation may exist as these methods may only predict interbed multiples associated with a single seismic reflector (i.e., generator), therefore introducing bias and the risk of not correctly capturing all interbed multiple generators.

The Jakubowicz method may involve manually picking a seismic reflector (i.e., a seismic horizon) within a 3D volume. Interbed multiples with upward-propagating reflections that occur below the seismic horizon of interest may be modeled using this technique. The identification of more than one internal multiple generator (i.e., seismic horizon) may be required, and the method may be implemented in separate passes. However, multiples with all upward-propagating reflections occurring below a given seismic horizon (especially deeper seismic horizons) are typically weaker than multiples that have upward-propagating reflections occurring both above and below the seismic horizon, due to the absorption of seismic energy, which increases with depth. It is therefore desirable to predict the stronger interbed multiples, which have upward-propagating reflections occurring both above and below the seismic horizon of interest.

Multiple attenuation methods that generate a multiple model require a second step for separating multiple energy from primary energy, e.g., subtraction of the multiple model from the seismic data. In some cases, a direct subtraction may suffice; however, depending on the method used, the multiple model may contain more multiple energy than the recorded seismic data itself, and/or the predicted multiples may not have the same phase, amplitude, timing, or frequency content as the recorded multiples. In these cases, a direct subtraction may not accurately remove multiples and an "adaptive subtraction" may be required.

Adaptive subtraction is commonly used to subtract a predicted noise model from seismic data. For multiple attenuation, the predicted multiple model is adapted, or filtered, to fit the recorded multiple before performing a subtraction using the adapted, or "filtered multiple model." Specifically, adaptive subtraction may estimate matching filters that eliminate mismatches between predicted multiples and recorded multiples in a series of overlapping data windows. A set of matching filters may be generated so that, once convolved with each seismic trace of the predicted multiple model, may generate a filtered multiple model. The filtered multiple model may then contain estimated multiple energy that matches the recorded multiple.

The preceding discussion of multiple modeling methods are by no means meant to limit the present disclosure, and any method known to one of ordinary skill in the art may be used to generate a predicted multiple model for use in multiple attenuation or removal.

Marchenko Equation

In accordance with one or more embodiments, internal multiples may be removed from a seismic dataset using a solution to the Marchenko equation. As shown in FIG. 4 this method may divide the subsurface into two portions: a shallow portion (302) and deeper portion (304) that may contain a target of interest to explorers for hydrocarbon. The method may express the complete seismic reflection response in terms of reflection and transmission responses of the two portions. The reflection response of the deeper portion (304) may then be extracted from the complete seismic reflection response.

Marchenko-based equation methods also require a seismic horizon of interest, splitting the subsurface into two parts: shallow (overburden) region and the deep (target) region (Joost van der Neut et al. "Adaptive overburden elimination with the multidimensional Marchenko equation" *Geophysics*, Vol. 81, No. 5, P. T265-284 (September-October 2016)). In Marchenko-based multiple prediction, the overburden is considered as a whole and does not require the identification of individual multiple generators for use in separate passes. All interactions of multiples within the overburden may be modeled, including strong interbed multiples with upward-propagating reflections occurring both above and below the seismic horizon of interest. That is, interbed multiples of all orders at any desired depth within the subsurface may be predicted without having to resolve overlying (overburden) layers first.

Figure 3B:
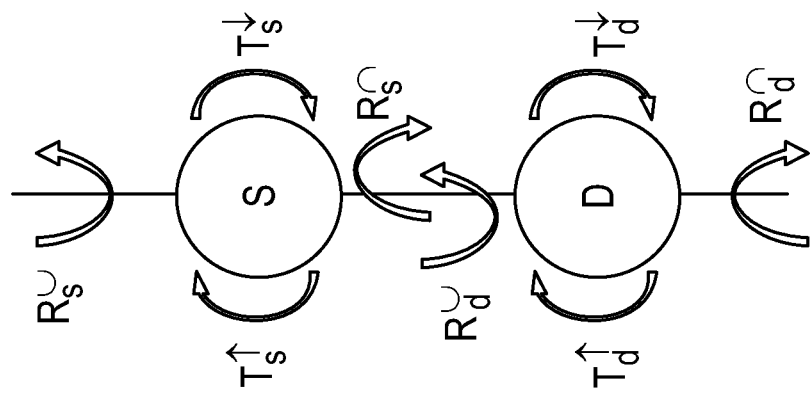
FIG. 3B depict mathematical operators in accordance with one or more embodiments.
Figure 3A:
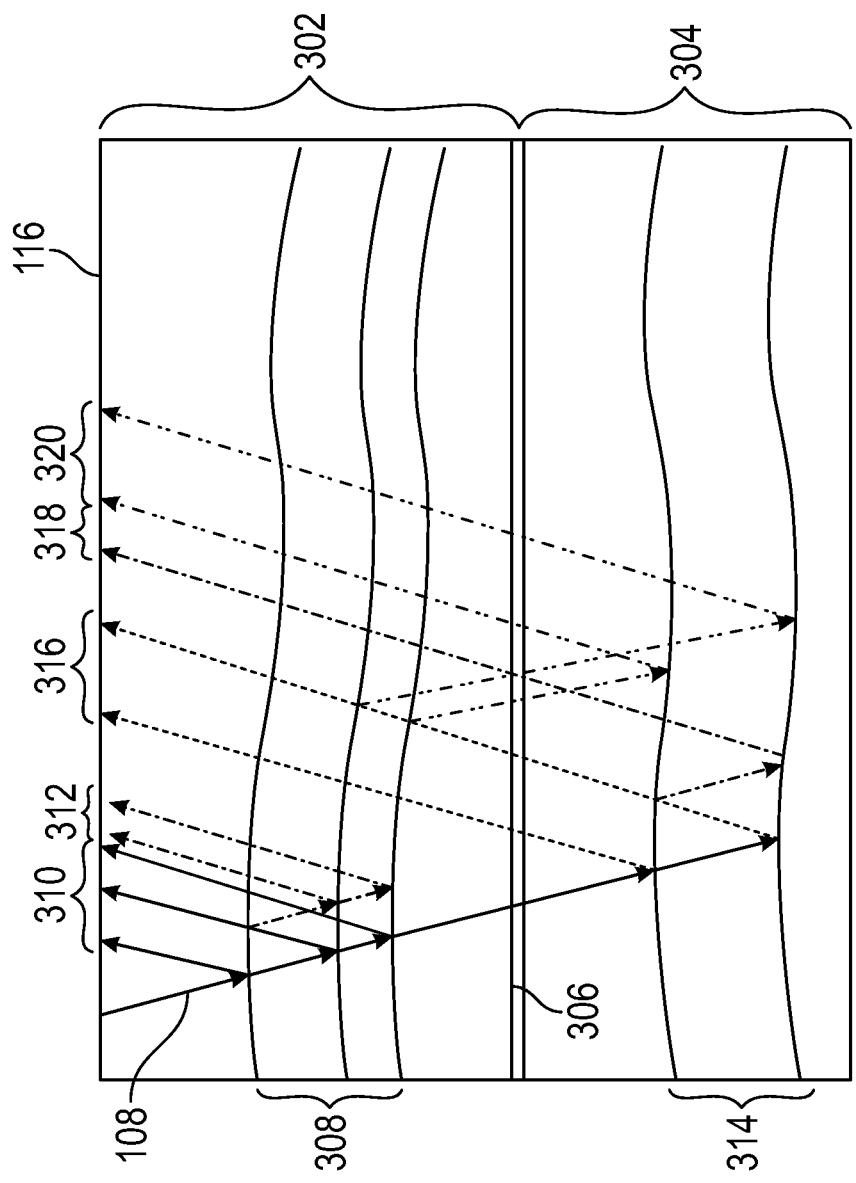
FIG. 3A depict seismic multiple ray paths in accordance with one or more embodiments.

FIG. 3A depicts a subterranean region divided into two portions, a shallower portion (302) and a deeper portion (304), by a dividing depth (306). In practice, the dividing horizon may be selected to be a depth at, or slightly shallower than, a target of potential interest, such as a potential hydrocarbon reservoir. A radiated seismic wave (108) propagates first through the shallower portion (302) and then through the deeper portion (304). In passing through the shallower portion (302) the radiated seismic wave (108) may intersect shallow seismic reflectors (308) located within the shallower portion (302) and generate shallow primaries (310). In addition, the shallow primaries (310) may themselves be partially reflected by shallow seismic reflectors (308) before they reach the surface of the earth (116) and generate shallow internal multiples, such as shallow internal multiples (312). Similarly, in passing through the deeper portion (304) the radiated seismic wave (108) may intersect deeper seismic reflectors (314) located within the deeper portion (304) and generate deep primaries (316). In addition, the deep primaries (316) may themselves be partially reflected by deeper seismic reflectors (314) before they reach the surface of the earth (116) and generate deep internal multiples, such as deep internal multiples (318). However, in addition, deep primaries (316) may themselves be partially by shallow seismic reflectors (308) before they reach the surface of the earth (116) and generate hybrid or "mixed" internal multiples, such as mixed internal multiples (320). Any internal multiple whose energy propagates across the dividing depth other than as the radiates seismic wave (108) may be categorized as a mixed internal multiple.

The propagation of seismic waves, including radiated seismic waves (108), primaries (310, 316) and multiples (312, 318, 320) may be simulated or modeled using an elastic wave equation or a simplification of the elastic wave equation, such as the acoustic wave equation. For example, using the detail-hiding notation of Berkhout, A. J., 1982*: Seismic migration—Imaging of acoustic energy by wave field extrapolation*, Elsevier ISBN: 9780444602008, the acoustic wave equation may be written as:

$$\partial X = A[X] \qquad \text{Equation (1)}$$

where X may be a vector containing the acoustic pressure and vertical particle velocity. In accordance with one or more embodiments, the linear operator A is diagonalizable, with eigenstates U and D representing upward propagating and downward propagating seismic waves. In these circumstances the incident upward and downward propagating waves U and D and the scattered upward and downward propagating waves U' and D' may be related as:

$$\begin{pmatrix} U' \\ D' \end{pmatrix} = \begin{pmatrix} T^\uparrow & R^\cup \\ R^\cap & T^\downarrow \end{pmatrix} \begin{pmatrix} U \\ D \end{pmatrix} \text{ such that} \qquad \text{Equation (2)}$$

$$\begin{pmatrix} T^\uparrow & R^\cup \\ R^\cap & T^\downarrow \end{pmatrix} \begin{pmatrix} T^{\downarrow *} & R^{\cap *} \\ R^{\cup *} & T^{\uparrow *} \end{pmatrix} = \begin{pmatrix} 1 & 0 \\ 0 & 1 \end{pmatrix},$$

where $T^\downarrow$ and $T^\uparrow$ are the transmission response of a portion of the subsurface to seismic waves from above and below, respectively; Ru and Rn are the reflection response of a portion of the subsurface to seismic waves from above and below, respectively. FIG. 3B illustrates the actions of these operators between and within the shallower portion (302) and the deeper portion (304).

The transmission responses (and their inverses) can be written as a sum of direct and multiply-scattered ("coda") parts, e.g., $T^\downarrow = T^\downarrow_{dir} + T^\downarrow_{coda}$. In simple, acoustic (single mode), dissipation-free cases, * denotes time reversed waves. In a more general setting however * may have a wider meaning and may also denote dissipative-effectual or pairs of non-reciprocal media reversal, or mode-reversal in multiple-mode supporting media.

Splitting the subsurface into two portions divided by the dividing depth (306) and denoting operators relating to the shallower portion (302) with the subscript "s", e.g., $T^\downarrow_s$ and the deeper portion (304) with the subscript "d", e.g., $T^\downarrow_d$. the cumulative reflection response, $R_{surf}$, is measured above the shallow portion (302) may be expressed as:

$$R_{surf} = R_s^\cup + T_s^\uparrow R_d^\cup (1 + R_s^\cap R_d^\cup + R_s^\cap R_d^\cup R_s^\cap R_d^\cup + \dots) T_s^\downarrow. \qquad \text{Equation (3)}$$

where, common to operator notation, the order of processes (trans-missions or reflections) should be read from right to left. Operator multiplication may be defined as follows:

$$[AB](x'_0, x_0, \omega) = \int dy A(x'_0, y, \omega) B(y, x_0, \omega) \qquad \text{Equation (4)}$$

FIG. 3B summarizes the effect of each of the operators. From the perspective of the expression in Equation (3), there are three distinct wavefield (and multiples) contributions to $R_{surf}$. Using $T^\downarrow = T^\downarrow_{s,dir} + T^\downarrow_{s,coda}$ and $T^\uparrow = T^\uparrow_{s,dir} + T^\uparrow_{s,coda}$ Equation (3) may be rewritten as:

$$R_{surf} = R_s^\cup + \hat{R}_d^\cup + \mathcal{M}_{src} + \mathcal{M}_{rec} + \mathcal{M}_{dsd} + \mathcal{M}_{mix}, \qquad \text{Equation (5)}$$

where $$\hat{R}_d^\cup = T_{s,dir}^\uparrow R_d^\cup T_{s,dir}^\downarrow, \qquad \text{Equation (6)}$$

$$\mathcal{M}_{src} = T_{s,dir}^\uparrow R_d^\cup T_{s,coda}^\downarrow, \qquad \text{Equation (7)}$$

$$\mathcal{M}_{rec} = T_{s,coda}^\uparrow R_d^\cup T_{s,dir}^\downarrow, \qquad \text{Equation (8)}$$

$$\mathcal{M}_{dsd} = T_{s,dir}^\uparrow R_d^\cup R_s^\cap R_d^\cup (1 - R_s^\cap R_d^\cup)^{-1} T_{s,dir}^\downarrow, \qquad \text{Equation (9)}$$

and $\mathcal{M}_{mix}$ contains all the other cross-terms. From the point of view of the shallow reflectors (308) in the shallower portion (302) as a generator of internal multiples which are concurrent in time and interfering with the deep primary reflections (316) of the deeper portion (304) a few categories of multiples may be distinguished:

i. internal multiples generated by multiple scattering in the shallower portion (302) together with primaries from the shallow section, —$R_s^\cup$ ii. internal multiples with multiple bounces prior to illuminating below the dividing depth (306), $\mathcal{M}_{src}$, iii. internal multiples with multiple bounces after illuminating below the dividing depth (306), $\mathcal{M}_{rec}$, iv. internal multiples resulting from reverberations between a shallow reflector (308) in the shallower portion (302) and a deeper reflector (314) in the deeper portion (304), and v. internal multiples originating from combinations of types (2)-(4).

Further there are internal multiples generated in the deeper portion (304). These internal multiples are included in $\hat{R}_d^\cup$ but these internal multiples will not be the focus of a Marchenko demultiple method focused on the elimination of internal multiples generated in the shallower portion (302).

The earliest recorded time of reflections, $T_s^\uparrow R_d^\cup T_s^\downarrow$, from the deeper portion (304) may be given by a two-way transmission time $t_B$, and the separation into different categories of internal multiples naturally depends on the choice of the dividing depth (306) between the shallower portion (302) ("overburden") and deeper portion (304) ("target") or, equivalently, by the choice of $t_B$. However, the goal of one or more embodiments is the determination of, the reflection response of the deeper portion (304), $\hat{R}_d^\cup$, without any internal multiple reflections or scattering generated in the shallower portion (302) but with the shallower portion (302) transmission amplitude losses. Calculating $\hat{R}_d^\cup$ may allow an immediate comparison with the full reflection response, $R_{surf}$, of the combined shallower portion (302) and deeper portion (304) as the phase and amplitude of the deep primaries remain unchanged.

To proceed and simplify the notation, Equation (3) may be rewritten in terms of the full target reflection response, $\hat{R}_d^\cup$, measured at the surface:

$$\hat{R}_d^\cup = T_s^\uparrow R_d^\cup T_s^\downarrow, \qquad \text{Equation (10)}$$

and a modified shallower portion (302) reflection response, $\mathcal{R}_s^\cup$, also measured at the surface:

$$\mathcal{R}_s^\cup = -T_s^{\uparrow-1} R_s^\cap T_s^{\downarrow-1}. \qquad \text{Equation (11)}$$

As a result, Equation (3) may be rewritten as:

$$R_{surf} = R_s^\cup + \hat{R}_d^\cup (1 + \mathcal{R}_s^\cup \hat{R}_d^\cup)^{-1}, \qquad \text{Equation (12)}$$

which may easily be inverted to obtain:

$$\hat{R}_d^\cup = (R_{surf} - R_s^\cup)(1 - \mathcal{R}_s^\cup(R_{surf} - R_s^\cup))^{-1}. \qquad \text{Equation (13)}$$

In accordance with one or more embodiments, to determine $\hat{\mathcal{R}}_d^{\cup}$ from Equation (13) it is convenient to introduce two so-called "dereverberation operators", $\tilde{v}^+$, and $v^+$. The first dereverberation operator may be written as:

$$\tilde{v}^+(x'_0, x_0, \omega) =$$

$$\int dx_i T_{dir}^{\uparrow}(x'_0, x_i, \omega) T^{\uparrow -1}(x_i, x_0, \omega) = 1 + T_{dir}^{\uparrow} \tilde{T}_{coda}^{\uparrow},$$

Equation (14)

and the second dereverberation operator may be written as:

$$v^+(x'_0, x_0, \omega) =$$

$$\int dx_i T^{\downarrow -1}(x'_0, x_i, \omega) T_{dir}^{\downarrow -1}(x_i, x_0, \omega) = 1 + \tilde{T}_{coda}^{\downarrow} T_{dir}^{\downarrow},$$

Equation (15)

where $T^{\uparrow -1}$ and $T^{\downarrow -1}$ are the left and right inverse of $T^{\uparrow}$ and $T^{\downarrow}$, respectively. In addition, $x_0$ and $x'_0$ denote source and receiver locations on the surface of the earth (116) and $x_i$ denotes a position vector on a subsurface datum, such as the dividing depth (306). In the event that inverse transmissions do not exist mathematically, Moore-Penrose pseudoinverses may be used for $T^{\uparrow -1}$ and $T^{\downarrow -1}$.

From the definitions in Equation 16, we can see that both dereverberation operators are evaluated at the surface of the earth (116), i.e., have their source and receiver at the acquisition plane and, unlike transmissions, they are independent of up-down decomposition normalization choice.

Using Equations (12), (13) and (14) $\hat{\mathcal{R}}_d^{\cup}$ may be defined as:

$$\hat{\mathcal{R}}_d^{\cup} = \tilde{v}_s^+ \hat{R}_d^{\cup} v_s^+ = \tilde{v}_s^+ (R_{surf} - R_s^{\cup})(1 - \mathcal{R}_s^{\cup}(R_{surf} - R_s^{\cup})^{-1}) v_s^+,$$

Equation (16)

where the subscript s indicates that only transmission and reflections from the shallow portion (302) are considered. Equations (15) features $\tilde{v}_s^+$, $v_s^+ R_s^{\cup}$, and $\mathcal{R}_s^{\cup}$ which are not directly measurable, and as a result Equation (16) cannot be immediately applied.

To address this challenge, conventional Marchenko approaches applied mutes to the wavefields in the space time domain. For example, the bounding time, to, may be specified in the space-time domain as a constant bounding time, i.e., $t_0$=const. In other case, an offset-variable bounding time may be used however, establishing the correct offset-dependence is frequently problematic. Furthermore, this conventional approach may make separating the multiple-suppressing events generated inside high velocity layers from event auto-correlations challenging, particularly at mid and far offsets. Finally, space-time gathers are ill-suited to handling reflections at or near the critical point (the angle at which no energy is transmitted through a layer boundary and all the energy is reflected) that commonly occur at far-offsets. These mutes work well only where there is no seismic velocity contrast between subsurface layers and then they are applied. However, in reality, velocity contrasts are always present, they are the main source of multiple reflections in practice, and application of mutes in the space-time domain may produce errors and artifacts.

However, in accordance with one or more embodiments, each of the challenges faced by conventional methods may be solved or mitigated by applying a mute in the τ–p domain using a bounding intercept time dependent on the ray parameter, $\tau_B(p)$. Specifically, $\hat{\mathcal{R}}_d^{\cup}$ may be written as:

$$\hat{\mathcal{R}}_d^{\cup} = \tilde{v}_s^+ \Theta_d [R^{\cup} v_s^+](1 - \chi)^{-1} \text{ where}$$

Equation (17)

$$\chi = \sum_s {}^{-1} \overline{\Theta_s} [\tilde{v}_s^+ R^{\cup}]^* \Theta_d [R^{\cup} v_s^+]$$

and where $\Sigma_s = T_{s,dir}^{\uparrow *} T_{s,dir}^{\downarrow}$ is the is the two-way transmission correction. The operators $\overline{\Theta}_d[U]=U-\overline{\Theta}_s^-[U]$ and $\overline{\Theta}_s^-[U]$ mute the wavefield U in the τ–p domain before and after a ray parameter dependent intercept time, $\tau_B(p)$, respectively. Specifically, the operators convert a space-time gather into the τ–p gather, mute the traces in the τ–p gather using the ray parameter dependent intercept time, $\tau_B(p)$, and return the τ–p gather into the space-time domain as a space-time gather using an inverse Radon transform. The mutes $\Theta_s^-$ and $\Theta_d$ may be found by reversing the source and receiver locations of the mutes $\overline{\Theta}_s^-$ and $\overline{\Theta}_d[U]$ respectively. This application of the Marchenko algorithm in the τ–p is thus an improvement on the conventional approach of applying the Marchenko algorithm in the t–x domain.

The deverberation operator, $v_s^+$, may be determined iteratively, or recursively, as:

$$v_s^+ = \sum_{j=0}^{\infty} \Omega_j [v_{s,e}^+]$$

Equation (18)

where $\Omega_j[x]=\Theta_s^+[R^{\cup *}\Theta_s^-[R^{\cup}\Omega_{j-1}[x]]]$, with $\Omega_0[x]=x$, and $v_{s,e}^+ = v_s^+ - \Theta_s^+[v_s^+]$. Here $\Theta_s^+[x]$ mutes before the ray parameter dependent intercept time, $\tau_0(p)$.

Figure 4B:
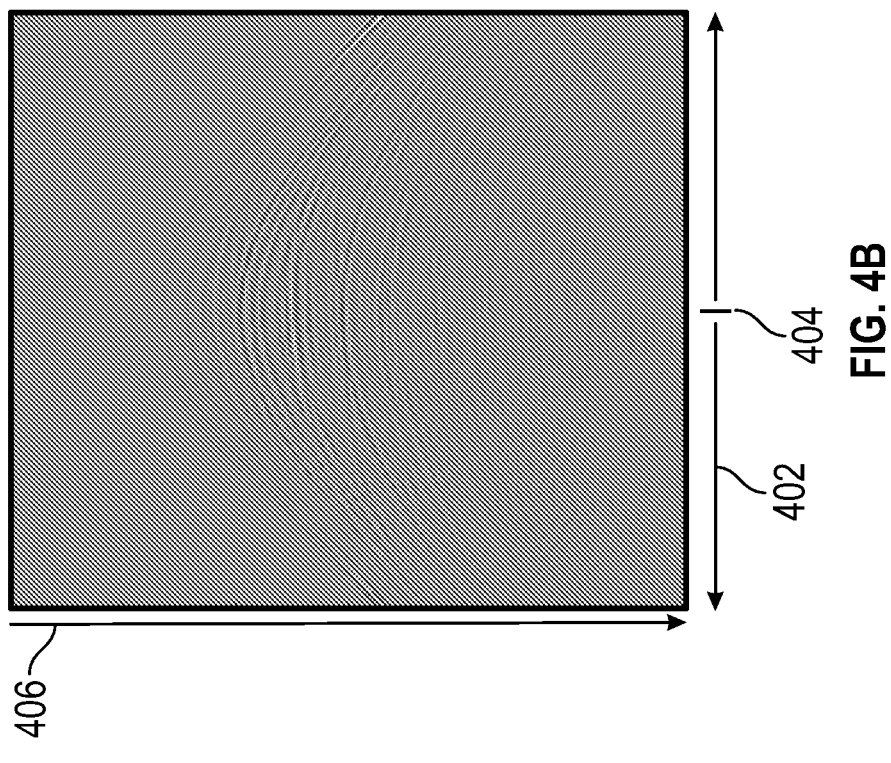
FIGS. 4A and 4B show examples of seismic data in accordance with one or more embodiments.
Figure 4A:
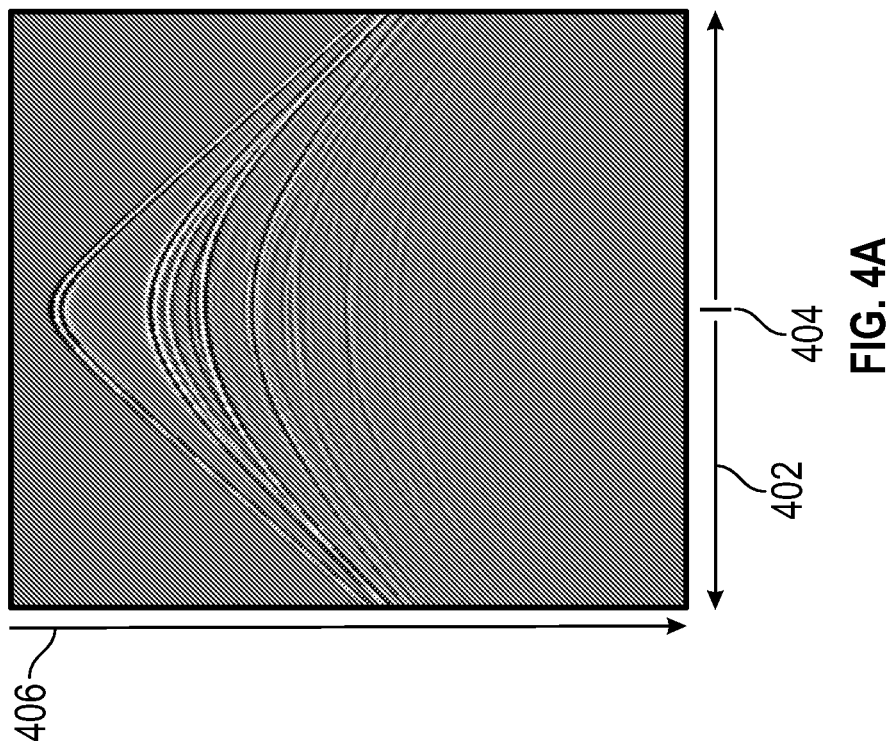

FIGS. 4A and 4B show examples of seismic data in accordance with one or more embodiments. Specifically, FIGS. 4A and 4B show synthetic seismic data sorted and grouped into a shot gather, with horizontal axis (402) representing offset increasing in opposite directions from a central location (404), and vertical axis (406) representing increasing time. The amplitude of the seismic data is represented using a grayscale, where gray indicates low or zero amplitude, white or light gray indicates positive amplitude, and black or dark gray indicates negative amplitude. FIG. 4A shows synthetic data representing recorded data, which includes both primary events and recorded multiple events.

FIG. 4B shows the predicted multiple events based on the synthetic data in FIG. 4A. The predicted multiples in this example are generated using a Marchenko-based multiple prediction method.

Primary-Free Time Window

When applied for the purposes of multiple removal the dividing depth (306) may be located at, or immediately above, a seismic target of interest, such as a hydrocarbon reservoir. However, for embodiments aimed at determining a scalar multiplier described in this disclosure the dividing depth (306) may be located at the surface of, or within, a geological formation free of significant seismic reflectors. In particular, it is preferable to use a thick geological formation free of significant seismic reflectors. In other words, in these embodiments, the dividing depth (306) is chosen such that there are no deep reflectors (314) of significance. In this context, significant may be interpreted as generating a seismic reflection amplitude greater than the ambient background seismic noise level. Thus, a geological formation free of significant seismic reflectors generates no seismic primary reflections with an amplitude greater the ambient seismic noise within a time window bounded by the two-way seismic travel time for seismic waves propagating from the source to the upper surface of the geological formation and the two-way seismic travel time for seismic waves propagating from the source to the lower surface of the geological formation.

In some embodiments, the geological formation free of significant seismic reflectors may be below the geological basement, i.e., a layer of crystalline rocks of igneous or metamorphic origin lying above the mantle and beneath geological rocks of sedimentary origin. The geological basement formations are typically thick and exhibit a high degree of homogeneity. In other embodiments, the geological formation free of significant seismic reflectors may be a thick sedimentary layer exhibiting a high degree of homogeneity.

As a consequence of the absence of primary reflections from the geological formation free of significant seismic reflectors the only significant seismic signals within the primary-free time window are multiples. Hence, the amplitudes of predicted seismic multiples, including those predicted using the Marchenko Equation, may easily be compared to the observed seismic data that is composed entirely, or almost entirely, of seismic multiples within the primary-free time window.

In accordance with one or more embodiments, when the seismic dataset is correctly scaled, i.e., is the true absolute-amplitude seismic dataset, then the primary reflections predicted by Equation (16) will have zero amplitude within the primary-free time window. This criterion, i.e., zero amplitude output seismic traces within the primary-free time window, may be used to determine the true absolute-amplitude of the seismic dataset. In some embodiments, the observed seismic dataset may be multiplied by a scalar multiplier prior to the prediction of the output seismic traces within the primary-free time window. Subsequently, the scalar multiplier may be altered, iteratively, and the output seismic traces re-predicted in a loop, until the amplitude of the output seismic traces approaches zero to with an acceptable tolerance. Choosing an approximate initial scalar multiplier, to initialize the iterative loop, is important in making this method efficient and is discussed in more detail below.

The observed seismic dataset, at any point in the seismic processing chain, has an overall intrinsic scaling factor due to both seismic receiver sensitivity and to the intrinsic scaling of each step in the chain to which it has been subjected. In general, this overall intrinsic scaling is poorly known and determining a scalar multiplier to correct for this overall intrinsic scaling may be the purpose of the embodiments disclosed herein.

Equation (17) represents an iterative series, frequently requiring twenty or even forty terms to be evaluated. If the scalar multiplier is too large, then the terms in the series will diverge, producing larger and larger signals with each increasing terms in the series. In this case the result is not only incorrect but also easily visibly detectable by a person of ordinary skill in the art. Conversely, if the scalar multiplier is too small, then the series converges too quickly, and the predicted multiples in the primary-free window will be of insufficiently large amplitude to cancel the observed multiples.

Choosing the approximate scalar multiplier to initiate the iterative process of finding the scalar multiplier that gives the true absolute-amplitude seismic data is an important step. In accordance with one or more embodiment, the approximate scalar multiplier may be selected based upon the spectrum of normal incidence component of the reflected waves. The normal incidence spectrum may be calculated from the zero-dip component of the Radon transform of the seismic data after conversion into the temporal frequency domain. Further, the approximate scalar multiplier may be chosen such that the amplitude spectrum of the normal incidence (after estimated wavelet deconvolution applied) is less than unity for all frequencies. For example, the approximate scalar multiplier may be chosen such that the maximum of the amplitude spectrum is equal to 0.8, implying that approximately 80% of the radiated energy is returned to the surface of the earth as primary and internal multiple reflections.

Figure 5A:
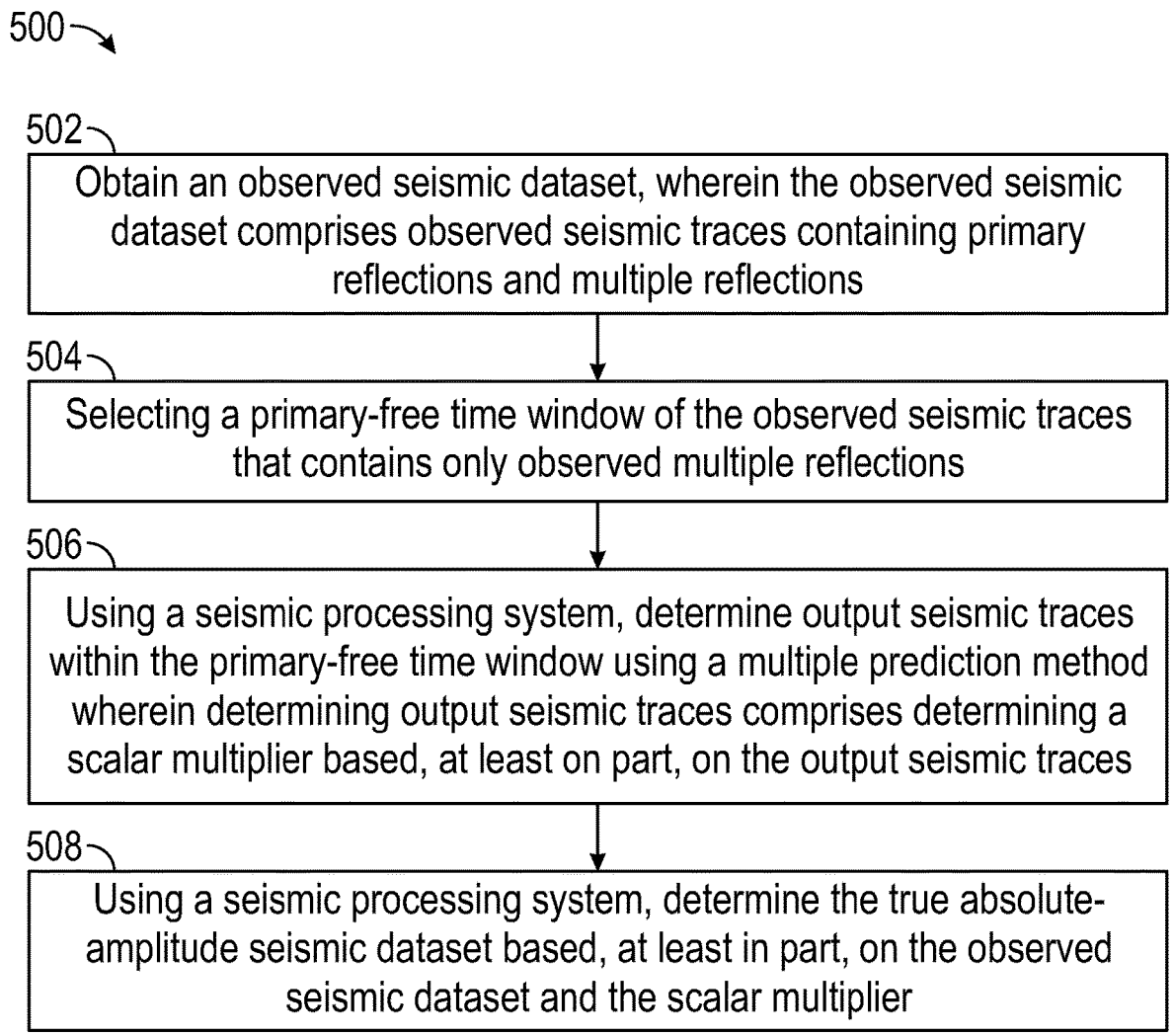
FIGS. 5A and 5B show flowcharts illustrating workflows in accordance with one or more embodiments.
Figure 5B:
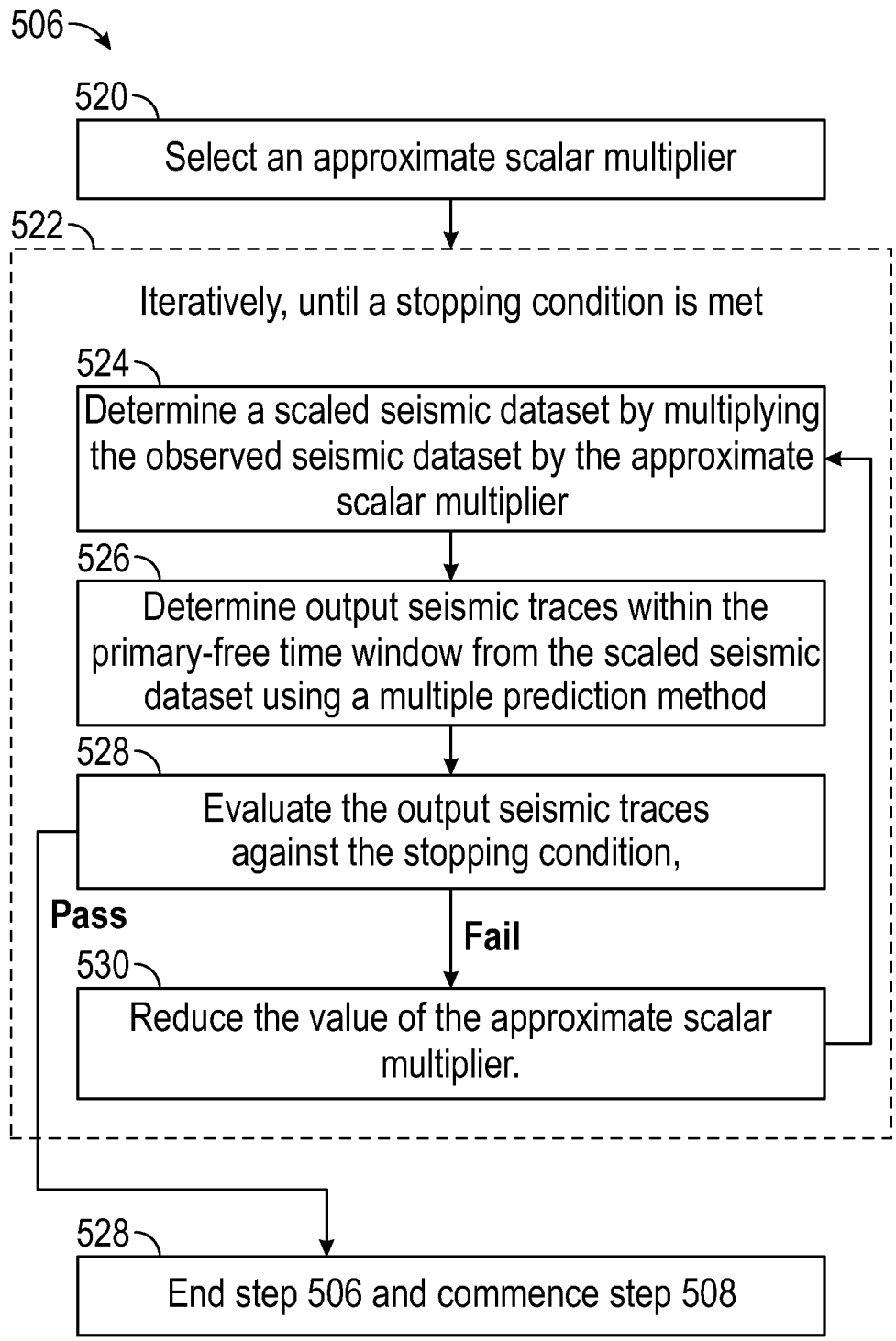

Turning now to FIGS. 5A and 5B, FIG. 5A shows a flowchart (500) in accordance with one or more embodiments. The flowchart (500) may depict steps for determining a true absolute-amplitude seismic dataset from an observed seismic dataset.

In Step 502 an observed seismic dataset may be obtained. The observed seismic dataset is made up of observed seismic traces containing primary reflections and multiple reflections. The observed seismic dataset may be a marine seismic dataset and the observed seismic traces be sorted into any gathers familiar to one of ordinary skill in the art, without limiting the scope of the invention. For example, the observed seismic traces may be arranged as shot-gather, common-offset gathers, common-midpoint gathers, or common-image gather. Further the observed seismic dataset may lie in the space-time domain, or may lie in a transformed domain such as the intercept time domain—ray parameter ($\tau$–p) domain.

In Step 504 a primary-free time window of the observed seismic traces containing only observed multiple reflections may be selected. For example, the primary-free time window may lie after a start time equal to or greater than a two-way reflection travel time from an upper basement surface. Alternatively, the primary-free time window may be bounded by the two-way reflection travel times associated with the upper and lower boundaries of a thick homogeneous, and hence reflection free, geological formation.

In Step 506, output seismic traces within the primary-free time window may be simulated using a multiple prediction method. Simulating the output seismic traces includes determining a scalar multiplier based, at least on part, on the output seismic traces. In accordance with one or more embodiments, the prediction method is based, at least in part, on a Marchenko multiple prediction method. Step 506 is described in more detail in connection with FIG. 5B below.

In Step 508, the true-absolute amplitude seismic dataset may be determined using a seismic processing system based, at least in part, on the observed seismic dataset and the scalar multiplier determined in Step 506. The true absolute-amplitude seismic dataset may be determined by multiplying the observed seismic dataset by the scalar multiplier determined in Step 506.

Further, in accordance with one or more embodiments, a seismic attribute volume may be formed, using a seismic processing system, from the true absolute-amplitude seismic dataset and a drilling target within a hydrocarbon reservoir may be determined with the help of a seismic interpretation workstation, from the seismic attribute volume. Still further, using a well planning system, a planned wellbore trajectory may be planned to reach the drilling target and a wellbore guided by the planned wellbore trajectory may be drilled, using a drilling system.

Turning to FIG. 5B, FIG. 5B depicts details of Step 506 in FIG. 5A. In Step 520 the process of simulating output seismic traces, for example using equation (17), within the primary-free time window begins with selecting an approximate scalar multiplier. Determining the approximate scalar multiplier may be based, at least in part, on a spectrum of a normal incidence seismic trace drawn from the observed seismic dataset. Further, the approximate scalar multiplier may be chosen to ensure the maximum amplitude of a temporal-frequency spectrum of the normal incidence trace is less than unity. In some embodiments, the initial scalar multiple may be chosen to be 0.8.

In Step 522 an iterative loop may be executed until a stopping condition is met. Some examples of stopping conditions are described in connection with Step 528 below. In the first step, Step 524, in the iterative loop 522 a scaled seismic dataset may be determined by multiplying the observed seismic dataset by the approximate scalar multiplier. In Step 526 output seismic traces within the primary-free time window may be simulated from scaled seismic dataset the using a multiple prediction method. In accordance with one or more embodiments, the multiple prediction method may be a Marchenko method.

In Step 528, the output seismic traces may be compared against a stopping condition. In some embodiments, consistent with the output seismic traces are simulated for a primary-free time window, the stopping condition may be that a measure of the amplitude of the output seismic traces reaches a minimum, i.e., that the simulated multiples have equal amplitude and opposite polarity to the observed seismic traces. In still other embodiments, the stopping condition may when the number of iterations of iterative loop 522 reaches a predetermined minimum. These stopping conditions may be used individually or in combination. For example, the stopping condition may be the minimum amplitude of the output seismic traces achieved prior to reaching a predetermined number of iterations.

If the output seismic traces satisfy the stopping condition, i.e., if the seismic traces pass the evaluation, then Step 506 will terminate and the process will move on to Step 508 of FIG. 5A. However, if the output seismic traces fail to satisfy the stopping conditions the value of the approximate scalar multiplier may be updated in Step 530 and iterative loop 522 will return and repeat steps 524, 526 and 528, until the stopping condition is satisfied. In some embodiments, the value of the approximate scalar multiplier may be systematically reduced with each iteration of the iterative loop. However, in other embodiments the value of the approximate scalar multiplier may be systematically increased while ensuring that the emitted and detected seismic waves do not violate energy conservation, i.e., ensuring that less energy is detected than is emitted. For example, energy conservation may be ensured by providing that the peak frequency of the wavelet deconvolved normal incidence spectrum does not exceed one.

Figure 6:
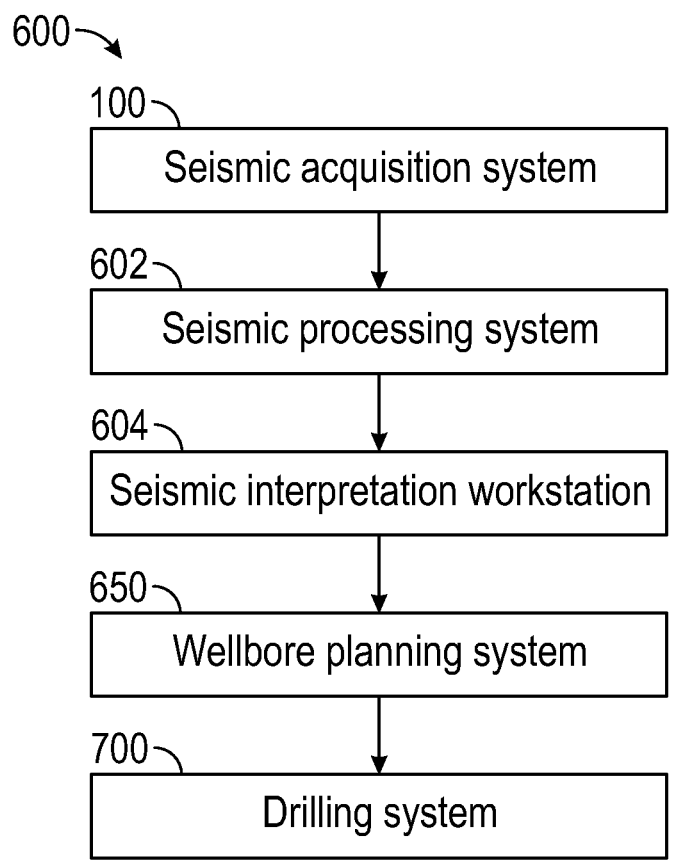
FIG. 6 depicts systems in accordance with one or more embodiments.

FIG. 6 shows a block diagram of systems (600) in accordance with one or more embodiments. FIG. 6 illustrates how a seismic processing system configured to determine a true absolute amplitude seismic dataset is integrated into an existing chain of systems, arranged to execute the practical application of drilling a wellbore to produce hydrocarbon from a subterranean hydrocarbon reservoir. While the system is part of an existing chain of systems and the methods executed by the system are a chain of existing methods, the disclosed embodiments constitute a novel improvement over the existing methods.

Each system may be coupled to one or more other systems within the series of systems (600). The seismic acquisition system (100) may be configured to record a seismic dataset generated during a seismic survey of a subterranean region of interest (102), as previously described in FIG. 1. The seismic dataset may be physically transferred to the seismic processing system (602) in the form of tape readers or high-capacity hard drives.

The seismic processing system (602) may receive the seismic dataset and may be used to process the seismic dataset. This may include processing steps such as pre-processing, noise attenuation (e.g., multiple attenuation), near-surface corrections, velocity analysis, migration (i.e., imaging), or attribute generation. In some embodiments, the seismic processing system (602) may be used to estimate, attenuate, or remove internal multiple reflections. Further, the seismic processing system (602) may be used to form a seismic image based on the multiple-attenuated seismic dataset. The seismic image may be transferred to a seismic interpretation workstation (604).

The seismic interpretation workstation (604) may be used to identify and label subsurface structures, such as geological layers, geological layer boundaries, faults and fractures, and boundaries between different types of pore fluids. In particular, a seismic interpretation workstation may be used to determine a location of a hydrocarbon reservoir (104) (or other subterranean features), based on the seismic image. Typically, a seismic interpretation workstation may be configured to facilitate interaction between the seismic interpretation workstation (604), the seismic data and images stored within the seismic interpretation workstation (604) and a human user. To achieve this the seismic interpretation workstation (604) may be equipped with two-dimensional (monitors) or three-dimensional (immersive or virtual reality) display capabilities and one or more mouse, wand, or equivalent devices designed to enable the identification, isolation, and labelling of subterranean features.

Knowledge of the existence and location of the hydrocarbon reservoir (104) and other subterranean features may be transferred to a wellbore planning system (650). The wellbore planning system (650) may use information regarding the hydrocarbon reservoir (104) location to plan a well, including a wellbore trajectory from the surface of the earth (116) of the earth to penetrate the hydrocarbon reservoir (104). In addition, to the depth and geographic location of the hydrocarbon reservoir (104), the planned wellbore trajectory may be constrained by surface limitations, such as suitable locations for the surface position of the wellhead, i.e., the location of potential or preexisting drilling rig, drilling ships or from a natural or man-made island. In addition, to the wellhead and drilling target locations a wellbore trajectory may be influenced by shallow drilling hazards, such as gas pockets, or subterranean water flows, or unstable or metastable fault zones. Further the wellbore trajectory may be constrained by limitations of the available drilling systems, e.g., by the maximum curvature ("dogleg") that the drillstring may tolerate, and the maximum torque and drag that the available drilling system may overcome. A wellbore planning system, composed of one or more computer systems and appropriate wellbore planning software may be used to plan the wellbore trajectory. The wellbore planning system may further determined planned wellbore caliper changes as a function of depth and the associated placement of casing ("casing points") to provide mechanical support for the wellbore during and after drilling and the protection of the wellbore from the undesired influx of formation fluids into the wellbore.

Typically, the wellbore plan is generated based on best available information at the time of planning from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes. The wellbore plan may be updated during the drilling of the wellbore. For example, the wellbore plan may be updated based upon new data about the condition of the drilling equipment, and about the subterranean region of interest (102) through which the wellbore is drilled.

Figure 8:
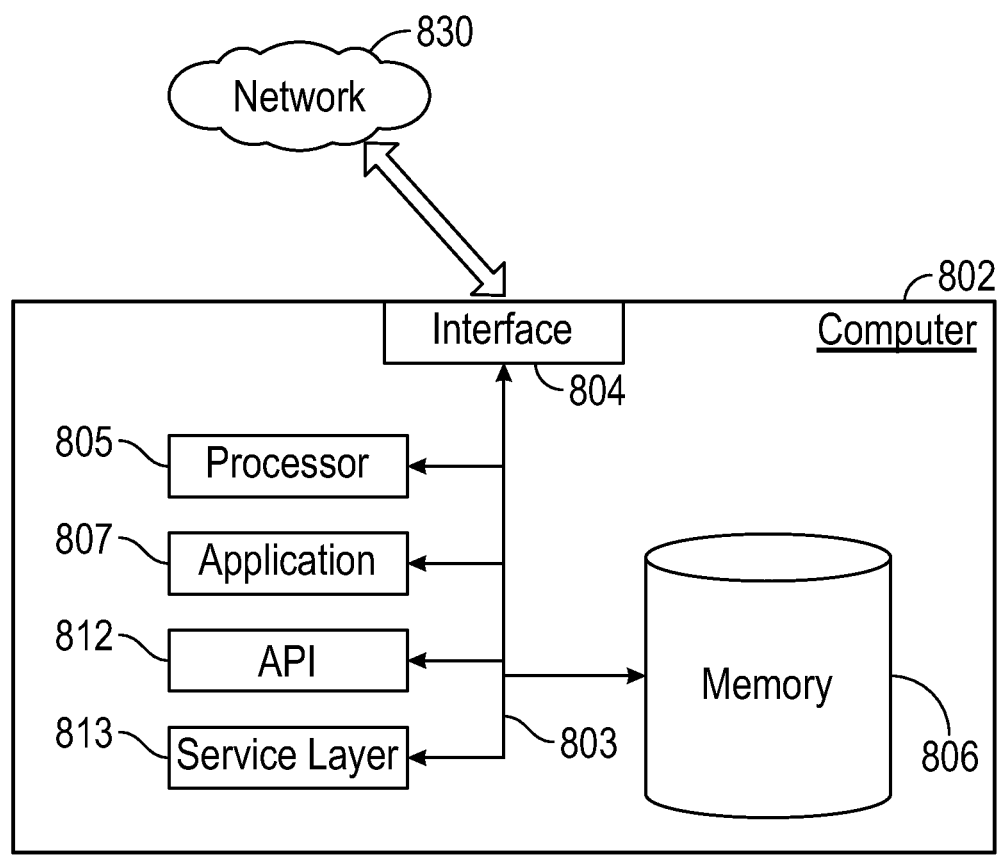
FIG. 8 depicts a computer system in accordance with one or more embodiments.

The wellbore planning system may include computer systems, such as the computer system described in FIG. 8, and may further include dedicated software to determine the planned wellbore path and associated drilling parameters, such as the planned wellbore diameter, the location of planned changes of the wellbore diameter, the planned depths at which casing will be inserted to support the wellbore and to prevent formation fluids entering the wellbore, and the drilling mud weights (densities) and types that may be used during drilling the wellbore.

Figure 7:
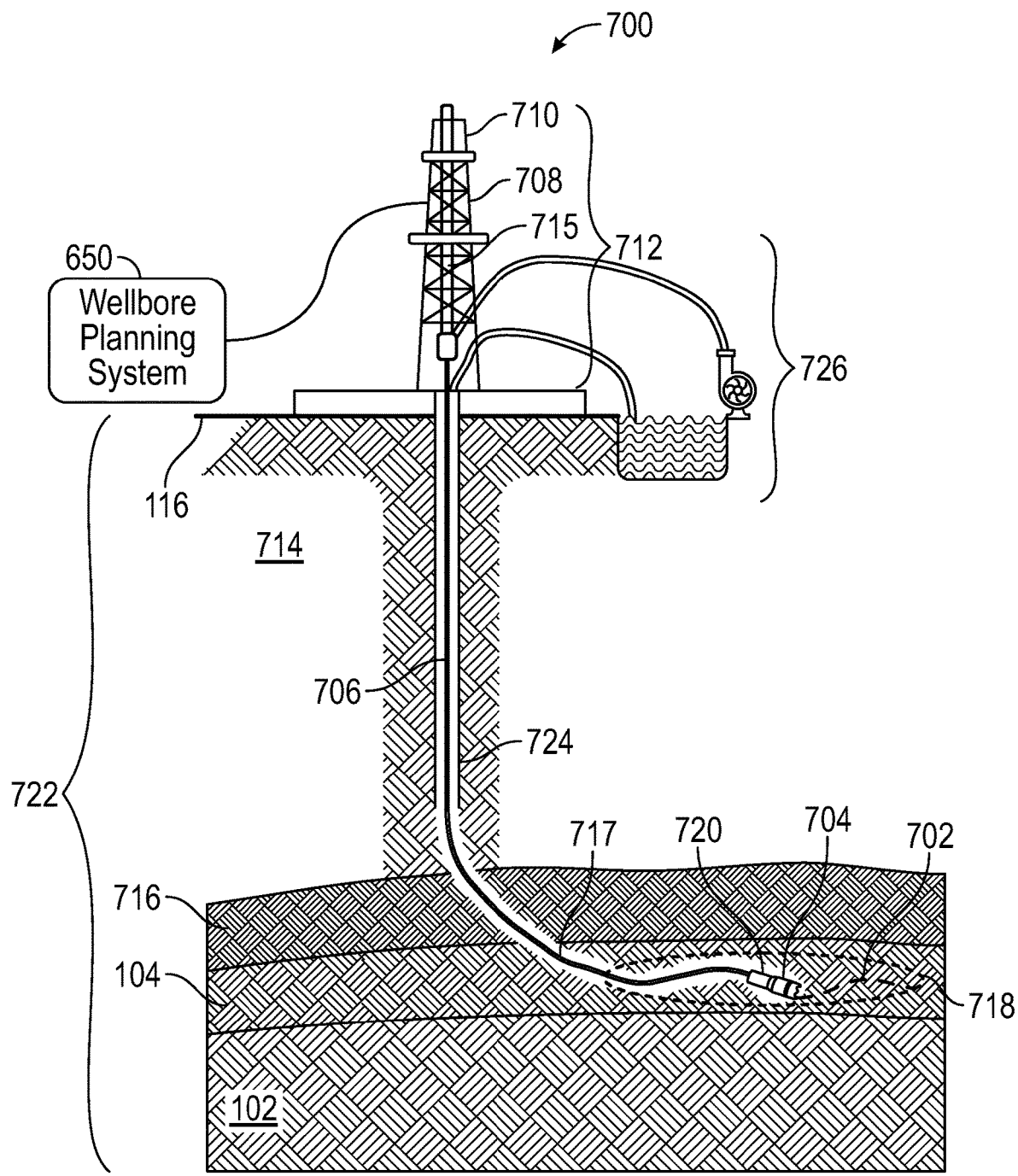
FIG. 7 depicts a drilling system gathers in accordance with one or more embodiments.

Information regarding the planned wellbore and wellbore trajectory may be transferred to the drilling system (700) described in FIG. 7. The drilling system (700) may drill the wellbore along the planned wellbore path to access and produce the hydrocarbon reservoir (104).

Systems such as the seismic acquisition system (100), the seismic processing system (602), the seismic interpretation workstation (604), and the wellbore planning system (650) may all include or be implemented on one or more computer systems such as the one shown in FIG. 8.

FIG. 7 shows a drilling system (700) in accordance with one or more embodiments. As shown in FIG. 7, a wellbore (717) following a wellbore trajectory (702) may be drilled by a drill bit (704) attached by a drillstring (706) to a drill rig (712) located on the surface of the earth (116). The drill rig (712) may include framework, such as a derrick (708) to hold drilling machinery. A top drive (710) sits at the top of the derrick (708) and provides clockwise torque via the drive shaft (715) to the drillstring (706) in order to drill the wellbore (717). The drillstring (706) may comprise a plurality of sections of drillpipe attached at the uphole end to the drive shaft (715) and downhole to a bottomhole assembly ("BHA") (720). The BHA (720) may be composed of a plurality of sections of heavier drillpipe and one or more measurement-while-drilling ("MWD") tools configured to measure drilling parameters, such as torque, weight-on-bit, drilling direction, temperature, etc., and one or more logging-while-drilling ("LWD") tools configured to measure parameters of the rock surrounding the wellbore (717), such as electrical resistivity, density, sonic propagation velocities, gamma-ray emission, etc.

The wellbore (717) may traverse a plurality of overburden (714) layers and one or more cap-rock (716) layers to a hydrocarbon reservoir (104) within the subterranean region (722), and specifically to a drilling target (718) within the hydrocarbon reservoir (104). The wellbore trajectory (702) may be a curved or a straight trajectory. All or part of the wellbore trajectory (702) may be vertical, and some wellbore trajectory (702) may be deviated or have horizontal sections. One or more portions of the wellbore (717) may be cased with casing (724) in accordance with the wellbore plan.

To start drilling, or "spudding in" the well, the hoisting system lowers the drillstring (706) suspended from the derrick (708) towards the planned surface location of the wellbore. An engine, such as a diesel engine, may be used to supply power to the top drive (710) to rotate the drillstring (706). The weight of the drillstring (706) combined with the rotational motion enables the drill bit (704) to bore the wellbore (717).

The near-surface is typically made up of loose or soft sediment or rock, so large diameter casing (724), e.g., "base pipe" or "conductor casing," is often put in place while drilling to stabilize and isolate the wellbore. At the top of the base pipe is the wellhead, which serves to provide pressure control through a series of spools, valves, or adapters. Once near-surface drilling has begun, water or drill fluid may be used to force the base pipe into place using a pumping system until the wellhead is situated just above the surface of the earth (116).

Drilling may continue without any casing (724) once deeper, or more compact rock is reached. While drilling, a drilling mud system (726) may pump drilling mud from a mud tank on the surface of the earth (116) through the drillsting (706). Drilling mud serves various purposes, including pressure equalization, removal of rock cuttings, and drill bit cooling and lubrication.

At planned depth intervals, drilling may be paused and the drillstring (706) withdrawn from the wellbore. Sections of casing (724) may be connected and inserted and cemented into the wellbore. Casing string may be cemented in place by pumping cement and mud, separated by a "cementing plug," from the surface of the earth (116) through the drill pipe. The cementing plug and drilling mud force the cement through the drill pipe and into the annular space between the casing and the wellbore wall. Once the cement cures, drilling may recommence. The drilling process is often performed in several stages. Therefore, the drilling and casing cycle may be repeated more than once, depending on the depth of the wellbore and the pressure on the wellbore walls from surrounding rock.

Due to the high pressures experienced by deep wellbores, a blowout preventer (BOP) (not shown) may be installed at the wellhead to protect the rig and environment from unplanned oil or gas releases. As the wellbore (717) becomes deeper, both successively smaller drill bits (704) and casing (724) may be used. Drilling deviated or horizontal wellbores may require specialized drill bits or drill assemblies.

A drilling system (700) may be disposed at and communicate with other systems in the well environment. The drilling system (700) may control at least a portion of a drilling operation by providing controls to various components of the drilling operation. In one or more embodiments, the system may receive data from one or more sensors arranged to measure controllable parameters of the drilling operation. As a non-limiting example, sensors may be arranged to measure weight-on-bit, drill rotational speed (RPM), flow rate of the mud pumps (GPM), and rate of penetration of the drilling operation (ROP). Each sensor may be positioned or configured to measure a desired physical stimulus. Drilling may be considered complete when a drilling target (718) is reached, or the presence of hydrocarbons is established.

FIG. 8 shows a computer system in accordance with one or more embodiments. The computer system is used to provide computational functionalities associated with described algorithms, methods, functions, processes, flows, and procedures as described in the present disclosure, according to one or more embodiments. The illustrated computer (802) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a graphical user interface (GUI).

The computer (802) can serve in a role as a client, network component, a server, a database or other persistency, or any other component (or a combination of roles) of a computer system for performing the subject matter described in the instant disclosure. The illustrated computer (802) is communicably coupled with a network (830). For example, a generic computer (802), seismic processing system (602), and seismic interpretation workstation (604) may be communicably coupled using a network (830). In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application, for example, executing on another computer (802) and responding to the received requests by processing the said requests in an appropriate software application. For example, since seismic processing and seismic interpretation may be not be sequential, each computer (802) system may receive requests over a network (830) from any other computer (802) and respond to the received requests appropriately. In addition, requests may also be sent to the computer (802) from internal users (for example, from a command console or by other appropriate access method), external or third-parties, other automated applications, as well as any other appropriate entities, individuals, systems, or computers.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (804) includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) also includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) further includes a memory (806) that holds data for the computer (802) or other components (or a combination of both) that can be connected to the network (830). For example, memory (806) can be a database storing data consistent with this disclosure. Although illustrated as a single memory (806) in FIG. 8, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) or a combination of the API (812) and service layer (813). The API (812) may include specifications for routines, data structures, and object classes. The API (812) may be either computer-language independent or dependent and refer to a complete interface, a single function, or even a set of APIs.

The service layer (813) provides software services to the computer (802) or other components (whether illustrated or not) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or another suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or submodules of another software module, enterprise application, or hardware module without departing from the scope of this disclosure.

There may be any number of computers (802) associated with, or external to, a computer system containing computer (802), wherein each computer (802) communicates over network (830). For example, one computer system may be specifically configured for seismic processing and denoted the seismic processing system (602). Another computer system may be specifically configured for seismic interpretation and denoted the seismic interpretation workstation (604). In some embodiments, seismic processing, such as steps 502-522 of FIG. 5, may be conducted using a first computer (802) configured as a seismic processor with one or more seismic processing applications (807).

Further, the term "client," "user," and other appropriate terminology may be used interchangeably as appropriate without departing from the scope of this disclosure. Moreover, this disclosure contemplates that many users may use one computer (802), or that one user may use multiple computers (802).

The final step in determining Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method comprising:
   obtaining, using a seismic acquisition system, an observed seismic dataset, wherein the observed seismic dataset comprises observed seismic traces containing primary reflections and multiple reflections;
   selecting a primary-free time window of the observed seismic traces that contains only observed multiple reflections;
   using a seismic processing system:
      determining output seismic traces within the primary-free time window using a multiple prediction method, wherein determining output seismic traces comprises determining a scalar multiplier based, at least in part, on the output seismic traces;
      determining a true absolute-amplitude seismic dataset based, at least in part, on the observed seismic dataset and the scalar multiplier; and
      forming a seismic attribute volume based, at least in part, on the true absolute-amplitude seismic dataset;
   determining, using a seismic interpretation workstation, a drilling target within a hydrocarbon reservoir based on the seismic attribute volume;
   planning, using a well planning system, a planned wellbore trajectory to reach the drilling target; and
   drilling, using a drilling system, a wellbore guided by the planned wellbore trajectory.

2. The method of claim 1, wherein determining output seismic traces further comprises:
   selecting a value of an approximate scalar multiplier;
   iteratively, until a stopping condition is met:
      determining a scaled seismic dataset by multiplying the observed seismic dataset by the approximate scalar multiplier,
      determining output seismic traces within the primary-free time window from the scaled seismic dataset using a multiple prediction method,
      evaluating the output seismic traces against the stopping condition, and
      updating the value of the approximate scalar multiplier.

3. The method of claim 1, wherein determining output seismic traces further comprises:
   determining an approximate scalar multiplier based, at least in part, on a spectrum of a normal incidence seismic trace drawn from the observed seismic dataset; and
   determining an approximately scaled seismic data set by multiplying the observed seismic dataset by the approximate scalar multiplier.

4. The method of claim 1, wherein the seismic acquisition system records a particle velocity caused by a seismic wave.

5. The method of claim 1, wherein the multiple prediction method comprises a Marchenko multiple prediction method.

6. The method of claim 1, wherein the primary-free time window comprises a start time, wherein the start time is equal to or greater than a two-way reflection travel time from an upper basement surface.

7. A non-transitory computer readable memory having computer-executable instructions stored thereon that, when executed by a processor, perform steps comprising:
   obtaining, using a seismic acquisition system, an observed seismic dataset, wherein the observed seismic dataset comprises observed seismic traces containing primary reflections and multiple reflections;
   selecting a primary-free time window of the observed seismic traces that contains only observed multiple reflections;
   determining output seismic traces within the primary-free time window using a multiple prediction method, wherein determining output seismic traces comprises determining a scalar multiplier based, at least in part, on the output seismic traces;
   determining a true absolute-amplitude seismic dataset based, at least in part, on the observed seismic dataset and the scalar multiplier;
   forming a seismic attribute volume based, at least in part, on the true absolute-amplitude seismic dataset;
   determining a drilling target within a hydrocarbon reservoir from the seismic attribute volume;
   planning a wellbore trajectory to the drilling target.

8. The non-transitory computer readable memory of claim 7, wherein determining output seismic traces further comprises:
   selecting a value of an approximate scalar multiplier;
   iteratively, until a stopping condition is met:
      determining a scaled seismic dataset by multiplying the observed seismic dataset by the approximate scalar multiplier,
      determining output seismic traces within the primary-free time window from the scaled seismic dataset using a multiple prediction method,
      evaluating the output seismic traces against the stopping condition, and
      updating the value of the approximate scalar multiplier.

9. The non-transitory computer readable memory of claim 7, wherein determining output seismic traces further comprises:
   determining an approximate scalar multiplier based, at least in part, on a spectrum of a normal incidence seismic trace drawn from the observed seismic dataset; and
   determining an approximately scaled seismic data set by multiplying the observed seismic dataset by the approximate scalar multiplier.

10. The non-transitory computer readable memory of claim 7, wherein the multiple prediction method comprises a Marchenko multiple prediction method.

11. The non-transitory computer readable memory of claim 7, wherein the primary-free time window comprises a start time, wherein the start time is equal to or greater than a two-way reflection travel time from an upper basement surface.

12. A system, comprising:
   a seismic acquisition system configured to obtain a seismic dataset;
   a seismic processing system configured to:

obtain an observed seismic dataset, wherein the seismic dataset comprises observed seismic traces containing primary reflections and multiple reflections, select a primary-free time window of the observed seismic traces that contains only observed multiple reflections, determine output seismic traces within the primary-free time window using a multiple prediction method, wherein determining output seismic traces comprises determining a scalar multiplier based, at least in part, on the output seismic traces;

determine a true absolute-amplitude seismic dataset based, at least in part, on the observed seismic dataset and the scalar multiplier; and form a seismic attribute volume from the true absolute-amplitude seismic dataset;

a seismic interpretation workstation configured to identify a drilling target within a hydrocarbon reservoir based on the true absolute-amplitude seismic dataset;

a well planning system configured to plan a wellbore trajectory to reach the drilling target; and a drilling system configured to drill a wellbore guided by the planned wellbore trajectory.

13. The system of claim 12, wherein determining output seismic traces further comprises:

selecting a value of an approximate scalar multiplier;

iteratively, until a stopping condition is met:

determining a scaled seismic dataset by multiplying the observed seismic dataset by the approximate scalar multiplier, determining output seismic traces within the primary-free time window from the scaled seismic dataset using a multiple prediction method, evaluating the output seismic traces against the stopping condition, and updating the value of the approximate scalar multiplier.

14. The system of claim 12, wherein determining output seismic traces further comprises:

determining an approximate scalar multiplier based, at least in part, on a spectrum of a normal incidence seismic trace drawn from the observed seismic dataset; and determining an approximately scaled seismic data set by multiplying the observed seismic dataset by the approximate scalar multiplier.

15. The system of claim 12, wherein the multiple prediction method comprises a Marchenko multiple prediction method.

* * * * *